(12) United States Patent
Pfleger et al.

(10) Patent No.: US 8,446,064 B2
(45) Date of Patent: May 21, 2013

(54) ROTOR FOR ROTARY ELECTRIC MACHINE INCLUDING OPEN CHAIN OF AT LEAST TWO INTERPOLAR MEMBERS DEFINING MAGNETIC BARRIER

(75) Inventors: Alexandre Pfleger, Noisy-le-Grand (FR); Olivier Gas, Paris (FR)

(73) Assignee: Valeo Equipments Electriques Moteur, Creteil (FR)

( * ) Notice: Subject to any disclaimer, the term of this patent is extended or adjusted under 35 U.S.C. 154(b) by 285 days.

(21) Appl. No.: 12/524,682

(22) PCT Filed: Dec. 21, 2007

(86) PCT No.: PCT/FR2007/052616
§ 371 (c)(1),
(2), (4) Date: Mar. 16, 2011

(87) PCT Pub. No.: WO2008/093032
PCT Pub. Date: Aug. 7, 2008

(65) Prior Publication Data
US 2011/0156503 A1    Jun. 30, 2011

(30) Foreign Application Priority Data

Jan. 30, 2007 (FR) ...................................... 07 52970

(51) Int. Cl.
*H02K 1/22* (2006.01)
(52) U.S. Cl.
USPC ................. 310/263; 310/156.66; 310/156.72

(58) Field of Classification Search
USPC .................. 310/263, 156.66, 156.72, 156.77; 29/596–598
See application file for complete search history.

(56) References Cited

U.S. PATENT DOCUMENTS

| | | | | |
|---|---|---|---|---|
| 5,793,144 | A * | 8/1998 | Kusase et al. | 310/263 |
| 5,925,964 | A * | 7/1999 | Kusase et al. | 310/263 |
| 6,369,485 | B1 * | 4/2002 | Oohashi et al. | 310/263 |
| 7,466,059 | B2 * | 12/2008 | Maeda et al. | 310/263 |
| 7,834,511 | B2 * | 11/2010 | Lutz et al. | 310/263 |
| 2004/0036376 | A1 * | 2/2004 | Pflueger | 310/263 |
| 2008/0211337 | A1 * | 9/2008 | Lutz et al. | 310/156.66 |

FOREIGN PATENT DOCUMENTS

FR   2 737 617 A1   2/1997
WO   WO 2007020131 A1 *  2/2007

* cited by examiner

*Primary Examiner* — Tran Nguyen
*Assistant Examiner* — Leda Pham
(74) *Attorney, Agent, or Firm* — Berenato & White, LLC

(57) ABSTRACT

A rotor (24) for a rotary electric machine (20), mainly for the automotive industry, has a front polar wheel (46N) and a rear polar wheel (46S). Each polar wheel (46N, 46S) includes claws (52) extending axially towards the other polar wheel (46N, 46S). Each claw (52) of the polar wheel (46N, 46S) is circumferentially interleaved between two claws (52) of the other polar wheel (46N, 46S). At least two interpolar gaps (62) are provided between the side faces (60) opposite two consecutive claws (52), and at least two members (68) defining a magnetic barrier are provided in two interpolar gaps (62) associated on either side of a predetermined claw (52D). The front longitudinal ends (72) of the two members (68) are connected by a connector (82) in order to define an open chain (80).

23 Claims, 10 Drawing Sheets

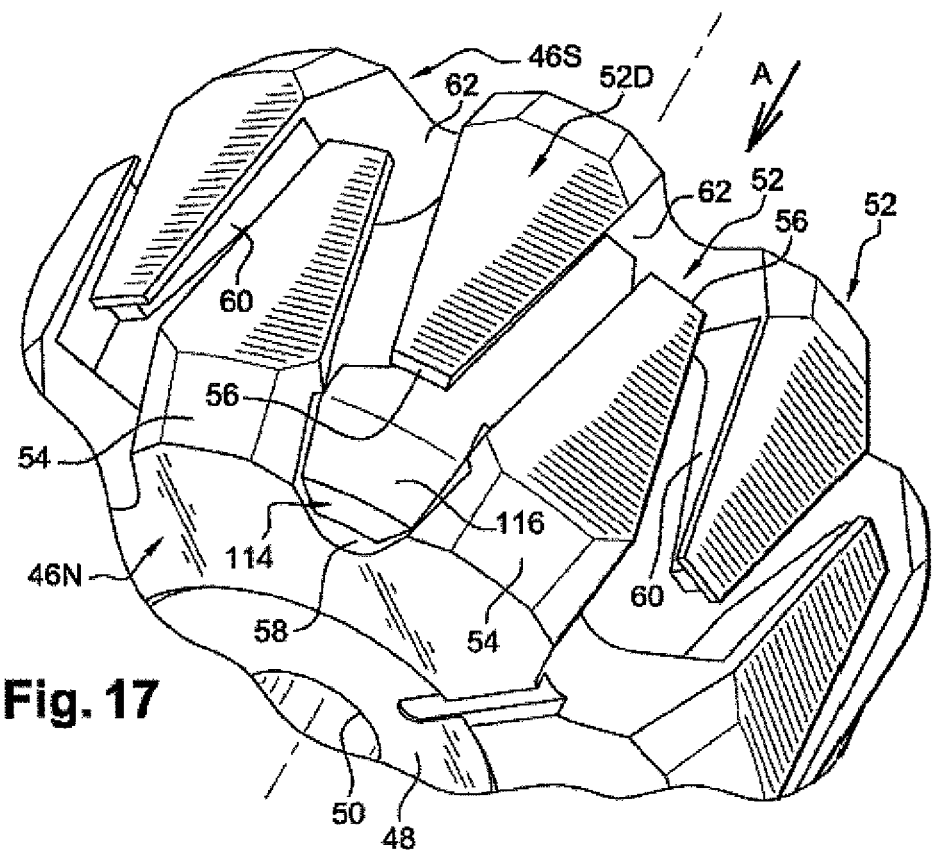
Fig. 17
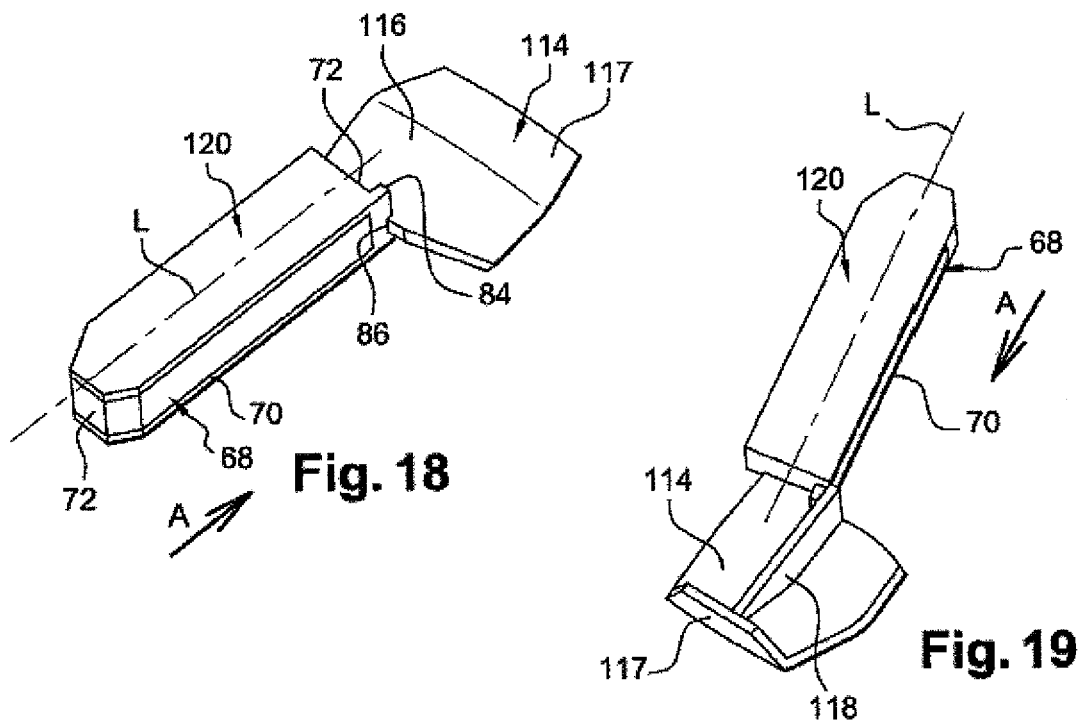
Fig. 18
Fig. 19

ROTOR FOR ROTARY ELECTRIC MACHINE INCLUDING OPEN CHAIN OF AT LEAST TWO INTERPOLAR MEMBERS DEFINING MAGNETIC BARRIER

CROSS-REFERENCE TO RELATED APPLICATIONS AND CLAIM TO PRIORITY

This application relates to International Application No. PCT/FR2007/052616 filed Dec. 21, 2007 and French Patent Application No. 0752970 filed Jan. 30, 2007, of which the disclosures are incorporated herein by reference and to which priority is claimed.

The invention relates to a rotor for a rotary electric machine in which at least two interpolar elements which form a magnetic barrier are arranged.

More particularly, the invention relates to a rotor for a rotary electric machine, in particular for an automotive vehicle, which is intended to be rotatably mounted about an axially orientated axis of rotation, and which comprises:
- a front polar wheel and a rear polar wheel which are mounted centrally on the axis of rotation;
- claws which extend axially in the direction of the other polar wheel from a base arranged at the periphery of each polar wheel to a free end, each claw of a polar wheel being circumferentially interleaved between two axially adjacent peripheral claws of the other polar wheel, each claw being delimited circumferentially by two lateral faces;
- at least two interpolar gaps which are provided between the facing lateral faces of two consecutive claws of each polar wheel;
- at least two elements forming a magnetic barrier which are arranged in two associated interpolar gaps either side of a claw under consideration of the rear polar wheel.

Rotors for rotary electric machines of this type are already known. During use of a rotary electric machine equipped with such a rotor, the claws of each polar wheel form magnetic poles, for example north for the front polar wheel and south for the rear polar wheel. The magnetic flux which circulates from the poles of one wheel to the poles of the other polar wheel moves in loops formed by a winding of the stator which surrounds the rotor.

An example of such a rotary electric machine is an alternator which is used to produce electric current in the winding of a stator when the rotor is mechanically driven in rotation.

In order to prevent the magnetic flux emitted by these poles from short-circuiting the loops of the stator winding, permanent magnets formed by ferromagnetic elements can be inserted between two consecutive opposed poles of the rotor.

However, mounting the magnets one by one in the rotor may prove to be complex and expensive.

This problem may be overcome as described in EP-A-0 866 542, for example, by arranging the magnets in supports which are connected together to form a closed belt. Thus, the belt of magnets may be mounted on the rotor in a single operation.

The proposed solution is suitable when all of the interpolar gaps are equipped with a magnet. However, many types of rotor exist in which only some of the interpolar gaps are equipped with magnets.

Further, the magnet supports are connected together via a connection which is intended to be arranged below the interior face of each claw of the rotor in order to retain the magnets during rotation of the rotor. For this reason, the dimensions of the connections must be sufficient to resist forces exerted by centrifugal force.

However, such links are bulky and they make the rotor heavier. Thus, the output of the rotary electric machine is affected.

Document EP-A-1 117 168 proposes mounting the magnets in pairs either side of a claw under consideration in the rotor in order to simplify mounting of the magnets in just some of the interpolar gaps of the rotor. To this end, the document proposes arranging the elements in supports which are connected together via a connecting flange.

This flange is intended to be arranged below the inner face of the claw under consideration. The member acts to retain the magnets during rotation of the rotor. That document, therefore, does not resolve problems concerning the weight of the rotor.

Further, International application WO-00/33440 describes a rotor comprising magnets retained by two parallel strips.

The invention thus aims to overcome these problems, in particular by proposing a rotor comprising a light arrangement for mounting elements forming a magnetic barrier in the interpolar gaps of a rotor of the type described above, characterized in that the longitudinal front ends of said two elements forming a magnetic barrier are connected together, in particular in order to form an open chain, via a connector which is connected via each of two ends to said longitudinal front ends of the elements forming a magnetic barrier and which is preferably intended to axially straddle the free end of the claw under consideration.

According to other characteristics of the invention:
- each end of the connector is connected to the associated element forming the magnetic barrier via a support which is intended to carry an element forming a magnetic barrier;
- the connector is articulated so as to form a hinge pivoting about at least one radial axis in order that the elements forming the magnetic barrier are pivotable with respect to each other;
- the connector is produced from a heat-fusible material in order to temporarily connect the elements forming a magnetic barrier;
- the connector is fixedly connected to the elements forming the magnetic barrier;
- the connector is produced from a plastic material;
- the supports are produced in one piece with the connector from a plastic material;
- each support is over-moulded about the element forming the associated magnetic barrier;
- the articulation of the connector is produced by means of at least one film of plastic material which is formed in one piece with the connector;
- the connector is produced from an amagnetic metallic material;
- each support is produced from an amagnetic metallic material formed in one piece with the material of the connector;
- the connector comprises positioning means on the claw under consideration which are intended to cooperate and fit with the associated positioning means of the free end of the claw under consideration by means of complementary shapes;
- the connector comprises a blade which extends axially in a direction opposite to the claw under consideration in order to form a blade for ventilation during rotation of the rotor;
- the connector comprises a tip which is intended to obscure a scallop comprised between the base of the two claws adjacent to the claw under consideration in order to prevent certain vibrations from resonating during rotation of the rotor;

the open chain of elements forming a magnetic barrier includes at least one third element forming a magnetic barrier;

the exterior edge of at least one lateral face of each interpolar gap comprises a rim which extends circumferentially towards the interior of the interpolar gap in order to radially retain the associated element forming a magnetic barrier to counteract the centrifugal force when the rotor is rotating;

the element forming a magnetic barrier is a permanent magnet, in particular formed from ferromagnetic material.

The invention also proposes a method for mounting a rotor of a rotary electric machine, characterized in that it comprises a first step for assembling an open chain of magnets on the rotor and a second step for magnetization of the magnets.

Advantageously, the support or supports are other than a sheet. If desired, this or these support(s) may be non-flexible and/or non-pliable.

In one exemplary embodiment of the invention, two neighbouring magnets are connected at only one of their ends, and not at both their ends.

Each open chain of magnets comprises exactly two magnets, for example. In other words the magnets are, for example, connected two by two via a connector.

In particular, the magnet support or supports are produced from an amagnetic material.

Each magnet in an interpolar gap may be formed from a single piece or, in a variation, from several pieces.

In accordance with other characteristics of the method:

the second magnetization step is carried out after the first assembly step;

the second magnetization step is carried out before the first mounting step, such that the polar radial faces facing the magnets of the open chain form poles of the same type and mutually repel.

Other advantages and characteristics will become apparent from the following detailed description made with reference to the accompanying drawings in which:

FIG. 17 is a perspective view similar to that of FIG. 16 which shows the magnet which is carried by an individual support equipped with a tip for obscuring the scallop of one of the polar wheels;

FIG. 18 is a perspective view on a larger scale which shows the magnet of FIG. 17 in its support;

FIG. 19 is an opposed perspective view of the magnet of FIG. 18.

In the remainder of the description analogous, similar or identical elements will be denoted by the same reference numerals.

In the remainder of the description, in a non-limiting manner, we shall designate a first reference direction as comprising an axial orientation indicated by the arrow "A" in the Figures which is directed from rear to front, radial orientations which extend perpendicular to the axial axis of orientation of the rotor and which are indicated by the arrow "R" which is directed from the interior towards the exterior, and a circumferential orientation which is orthogonal to the axial "A" and radial "R" orientations and which is indicated by the arrow "T".

In the remainder of the description, we shall also use a second local reference direction in respect of each magnet and comprises a radial orientation "R" which is identical to the radial orientation "R" of the first reference direction, a longitudinal orientation "L" which forms an angle "α" with the axial orientation "A" in order to be directed along the principal axis of the associated magnet, and a transverse orientation which is perpendicular to the radial "R" and longitudinal "L" directions.

Further, the radial faces orientated towards the centre of the rotor are designated as internal faces, while the faces orientated in the opposite direction are designated as the external faces. Similarly, the axial faces orientated towards the axis of rotation of the shaft are designated as interior faces, while the axial faces orientated in the opposite direction are designated as the exterior faces.

Figure 1:
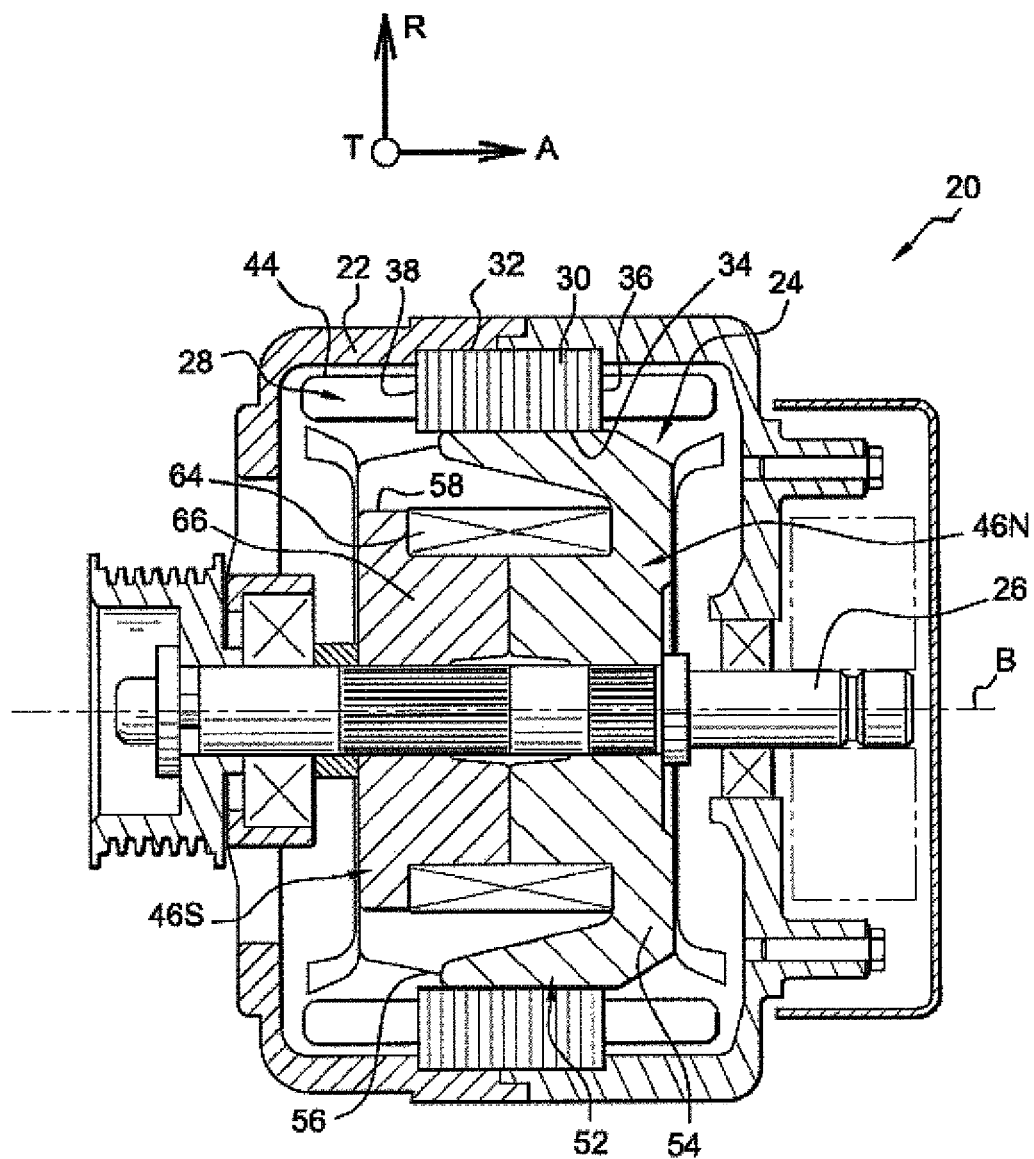
FIG. 1 is an axial section through an alternator provided with a rotor.

Referring now to FIG. 1, we show a rotary electric machine 20, in the present case an alternator of the polyphase type, for an automotive vehicle with a heat engine. Clearly, the alternator may also be reversible and consist of a starter-alternator, in particular to start the heat engine of the vehicle.

When the rotary electric machine 20 operates in alternator mode, it transforms mechanical energy into electrical energy in common with all alternators.

When the rotary electric machine 20 operates in electric motor mode, in particular in starter mode to start the heat engine of the vehicle, it transforms electrical energy into mechanical energy.

This rotary electric machine 20 essentially comprises a casing 22 and inside it a rotor 24 which comprises a central shaft 26. The central shaft 26 is rotatably mounted with respect to the casing 22 about its axis of rotation with axial orientation "B". The casing 22 also includes a stator 28 which surrounds the rotor 24.

Figure 2:
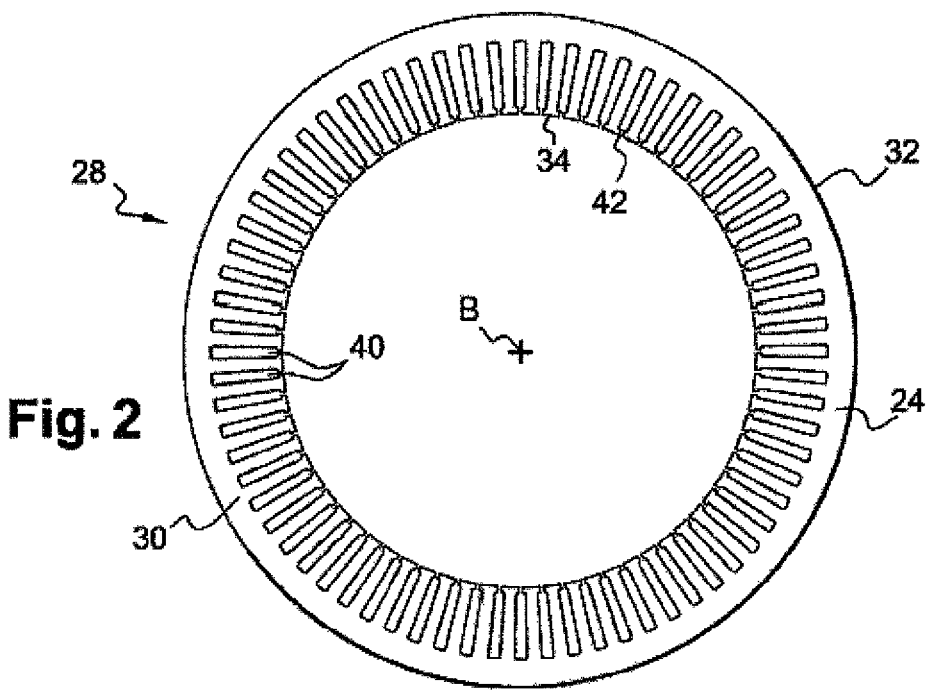
FIG. 2 is an axial view showing the body of the stator of the alternator of FIG. 1.

As can be seen in FIG. 2, the stator 28 comprises an annular cylindrical body 30 which is coaxial with the rotor 24. The stator 28 is formed by an axially stacked pack of sheets. The annular body 30 is defined radially by an exterior cylindrical face 32 and by an interior cylindrical face 34, and is defined axially by a radial annular front face 24 and by a radial annular rear face 26.

The annular body 30 comprises a plurality of notches 40 which extend axially so as to open into each of the front 24 and rear 26 radial faces. The annular body 30 here is of the semi-closed type, i.e. each notch 40 also opens radially into the interior cylindrical face 34 via an axial slot 42 to allow a stator winding 44 forming coils either side of the annular body 30 to be mounted.

This stator winding 44 is, for example, a six-phase winding which thus comprises a set of six phase windings. The outlets for the stator winding 44 are connected to a rectification bridge (not shown) comprising rectifier elements such as diodes or MOSFET type transistors, in particular when the rotary electric machine 20 is of the reversible type and consists of a starter-alternator as described, for example, in document FR-A-2 725 445 (US-A-6 002 219).

Each phase winding is obtained using a continuous wire, which is electrically conducting, covered with an insulating layer and mounted in a series of notches 40 associated with the annular body 30 of the stator 28. In the implementation shown in the Figures, the stator winding 44 comprises six phase windings, and the conducting wire of a phase winding is inserted in every six notches 40.

In a variation, in order to reduce the ripple factor and magnetic noise, the stator winding 44 comprises two sets of three-phase windings in order to form a composite stator winding device, the windings being offset by thirty electrical degrees as described, for example, in documents US-A1-2002/0175589, EP-A-0 454 039 and FR-A-2 784 248. In this case, two rectification bridges are provided and any combination of star and/or triangle three-phase windings is possible.

It should be noted that in the embodiment described, the rotor 24 comprises eight pairs of poles. Thus, forty-eight notches 40 are provided in the annular body 30 of the stator 28 in the case in which two sets of three-phase windings are provided, as described in FR-A-2 737 063 cited above, or ninety-six notches 40 in the solutions described in documents US-A1-2002/0175589 and EP-A-0 454 039 cited above.

Clearly, depending on the application, the rotor 24 may comprise a different number of pairs of poles.

In a variation which is not shown, in order to better fill the notches 40 of the annular body 30 of the stator 28, the windings are produced from conductors in the form of bars, such as pins, connected together by welding, for example.

The rotor 24 is a claw rotor as described, for example, in documents US-A1-2002/0175589 and EP-A-0 454 039, comprising a first front polar wheel 46N and a second rear polar wheel 46S which are axially juxtaposed. Each polar wheel 46N, 46S comprises a circular radial plate 48 provided with a central orifice 50 for passage of the central shaft 26. The polar wheels 46N, 46S are thus mounted centrally on the central shaft 26 thereby. Each polar wheel 46N, 46S is rotatably connected with the central shaft 26.

Figure 3:
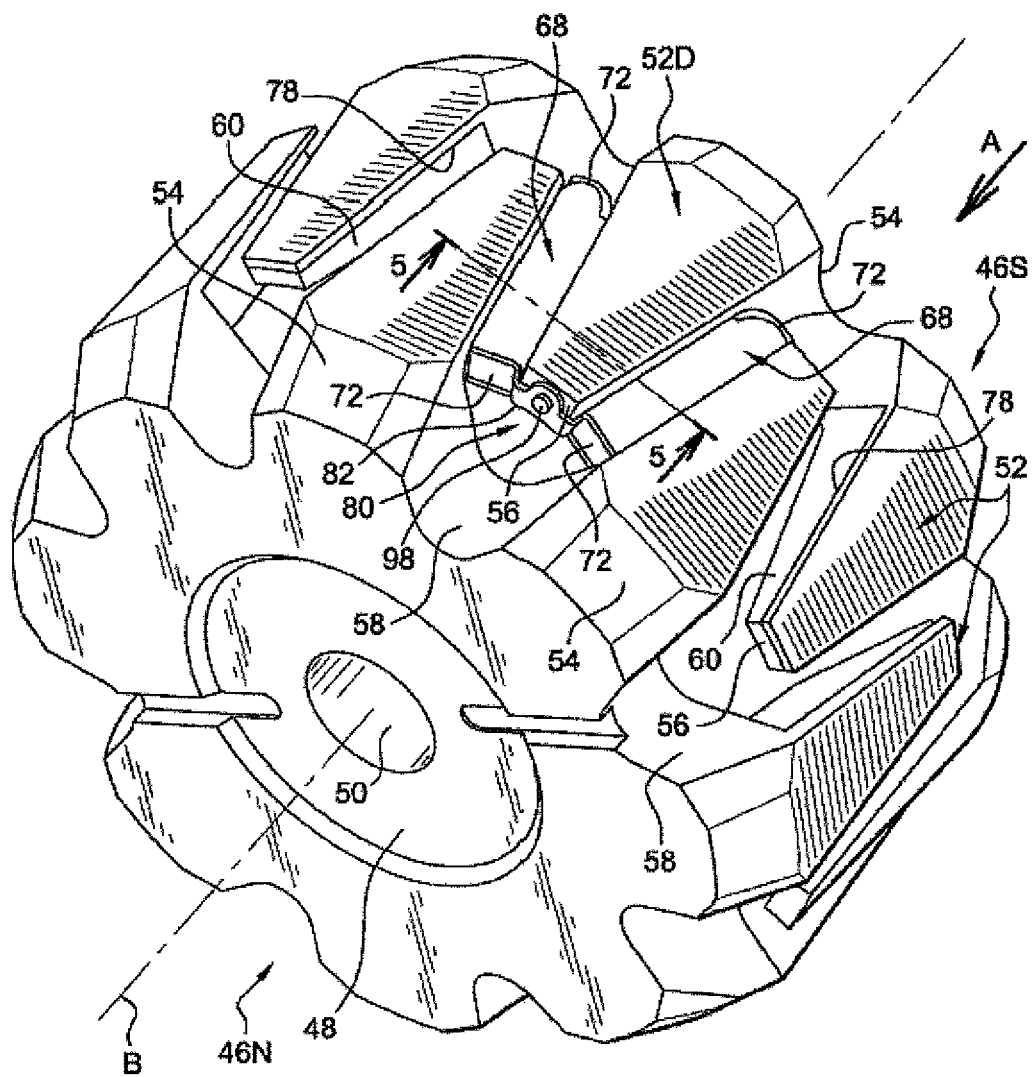
FIG. 3 is a perspective view showing the two polar wheels of the rotor of FIG. 1 between which is arranged an open chain of two magnets produced in accordance with a first embodiment.

As can be seen in FIG. 3, each polar wheel 46N, 46S also comprises claws 52 which extend axially in the direction of the other polar wheel 46N, 46S from a base 54 which is arranged at the outer periphery of the plate 48 to a free end 56. Each polar wheel 46N, 46S here comprises eight claws 52.

In accordance with a variation, not shown, each polar wheel 46N, 46S comprises six claws 52.

The claws 52 are distributed in a regular manner around the periphery of the plate 48 of the polar wheel 46N, 46S. All of the claws 52 are identical here.

Each polar wheel 46N, 46S includes scallops 58 which are circumferentially defined by the base 54 of two adjacent claws 52.

Figure 4:
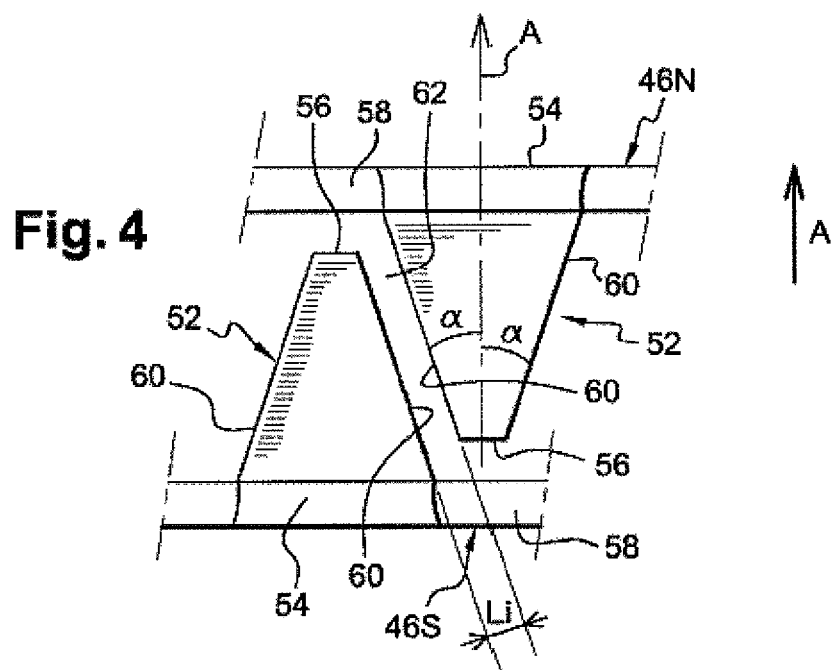
FIG. 4 is a plan view showing two claws of the two polar wheels which are interleaved one with the other.

As can be seen in FIG. 4, each claw 52 has a trapezoidal shape converging from the base 54 to the free end 56. Each claw 52 is circumferentially defined by two radial lateral faces 60. More particularly, each claw 52 here forms a truncated isosceles triangle the peak of which forms the free end 56 of the claw 52 and the base of which is formed by the base 54 of the claw 52. Each lateral face 60 thus forms the same angle "α" with respect to the axial direction "A". This angle "α" will hereinafter be termed the "claw angle".

Each claw 52 of a polar wheel 46N, 46S is circumferentially interleaved between two adjacent peripheral axial claws 52 of the other polar wheel 46N, 46S such that each lateral face 60 of the claws 52 of the front polar wheel 46N are arranged face to face with a lateral face 60 of a claw 52 of the front polar wheel 46S and vice versa. The claws 52 of the two polar wheels 46N, 46S are identical, and so facing lateral faces 60 are substantially parallel.

Thus, the free end 56 of each claw 52 of a polar wheel 46N, 46S is arranged facing a scallop 58 associated with the other polar wheel 46N, 46S.

The claws 52 of the front polar wheel 46N are intended to form magnetic poles with a first sign, for example north, while the claws 52 of the rear polar wheel 46S are intended to form the magnetic poles of a second sign, for example south. Thus, the interleaved claws 52 form alternating north poles and south poles.

The polar wheels 46N, 46S are not in contact with each other. To this end, the interpolar gaps 62 are provided between the substantially parallel facing lateral faces 60 of two consecutive claws 52 of the front polar wheel 46N and the rear polar wheel 46S. Thus, two associated facing lateral faces 60 are spaced from each other by a width "Li" and they define the interpolar gap 62.

Referring to FIG. 1, an excitation winding 64 is installed axially between the plates 48 of the polar wheels 46N, 46S. It is carried by a portion of the rotor 24 in the form of a cylindrical annular core 66 coaxial with the central shaft 26, which includes a central bore. In a non-limiting manner, the core 66 here is constituted by two axially distinct sections one of which is produced in a single piece with an associated polar wheel 46N, 46S.

In known manner, the elements 68 forming a magnetic barrier such as permanent magnets, in particular formed from ferromagnetic material, are arranged in at least two interpolar gaps 62 of the rotor 24. In the example shown in FIGS. 3, 8, 11 and 13, and to simplify comprehension of the invention, the rotor 24 only comprises two adjacent magnets 68 which are arranged in two consecutive associated interpolar gaps 62 of the rotor 24, either side of the claw 52D under consideration of the rear polar wheel 46S.

In a variation which is not shown, all of the interpolar gaps 62 are provided with magnets 68.

As can be seen in FIGS. 3, 5, 6 and 7, each magnet 68 here is formed by a single parallelepipedal bar with a principal longitudinal axis "L" parallel to the associated lateral faces 60 of the interpolar gap 62 and is entirely constituted by a ferromagnetic material. All of the magnets 68 here have identical shapes and dimensions.

More particularly, the magnet 68 is defined transversely by two north and south polar radial faces which are arranged facing each of the lateral faces 60 of the interpolar gap 62. More precisely, the north polar face 70 is arranged facing the lateral face 60 of the claw 52 of the north front polar wheel 46N, and the south polar face 70 is arranged facing the lateral face 60 of the claw 52 of the south rear polar wheel 46S.

The magnet 68 is also defined longitudinally by two longitudinal end faces 72 and it is defined radially by an interior face 74 and by an exterior face 76.

Figure 5:
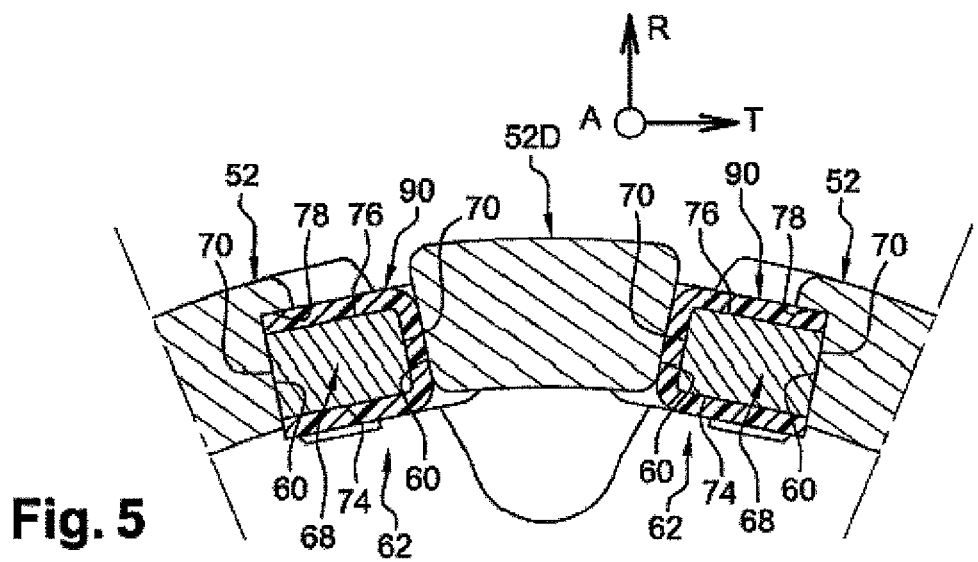
FIG. 5 is a radial sectional view along the sectional plane 5-5 of FIG. 3 showing the two magnets.

In known manner and as can be seen in FIG. 5, the magnets 68 are arranged in longitudinal grooves which are formed in the lateral faces 60 which define the interpolar gap 62. One example of such grooves and their production process is described in document FR-A-2 793 085.

More particularly, the exterior edge of at least one lateral face 60 of the interpolar gap 62 comprises a rim 78 which extends circumferentially towards the interior of the interpolar gap 62 in order to radially retain the magnet 68 against centrifugal force when the rotor 24 rotates rapidly.

During use of the alternator, the excitation winding 64 of the rotor 24 is supplied with electricity so that a magnetic field with axial axis "B" is induced. This magnetic field of the rotor is channelled by the polar wheels 46N, 46S so that it emerges via the claws 52.

The polarity of the magnets 68 arranged in the interpolar gaps 62 is orientated so as to prevent the magnetic flux from "jumping" directly from one polar wheel 46N, 46S to the other passing via the interpolar gap 62. The magnet 68 thus forms a magnetic barrier. Hence the magnetic flux is deformed so as to be redirected towards the winding loops of the stator 44.

The rotor 24 is then driven in rotation about its axis "B" and in accordance with a well-known physical phenomenon, passage of each claw 52 radially at right angles to each loop of the windings of the phase winding of the stator 44 induces an electric current in the winding of the stator 44.

The rotor 24 comprises a plurality of magnets 68 which are generally mounted symmetrically with respect to the axis "B" of the rotor 24 to avoid the formation of an imbalance during rotation of the rotor 24.

The magnets 68 are often arranged in pairs, or even in threes or more, in consecutive interpolar gaps 62. More particularly, at least two adjacent magnets 68 are arranged in two associated interpolar gaps either side of the claw under consideration 52D. As can be seen in FIG. 3, the claw under consideration 52D belongs here to the rear polar wheel 46S.

FIGS. 3 to 16 show four embodiments of an arrangement for facilitating mounting of the magnets 68 in the rotor 24 of the rotary electric machine 20.

In accordance with a first implementation and as illustrated in FIG. 3, the longitudinal front end faces 72 of two adjacent magnets 68 are connected together. Thus, the two adjacent magnets 68 form an open chain 80.

Figure 6:
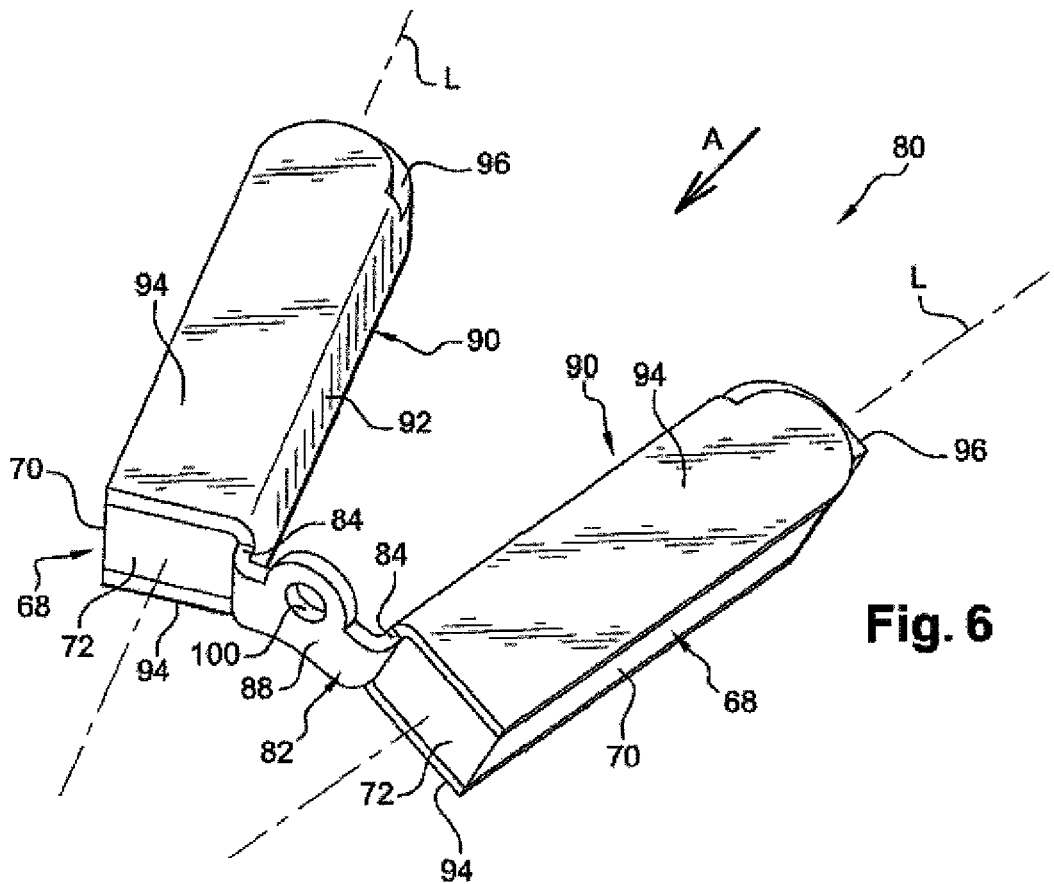
FIG. 6 is a perspective view on a larger scale showing the open chain of two magnets of FIG. 3.
Figure 7:
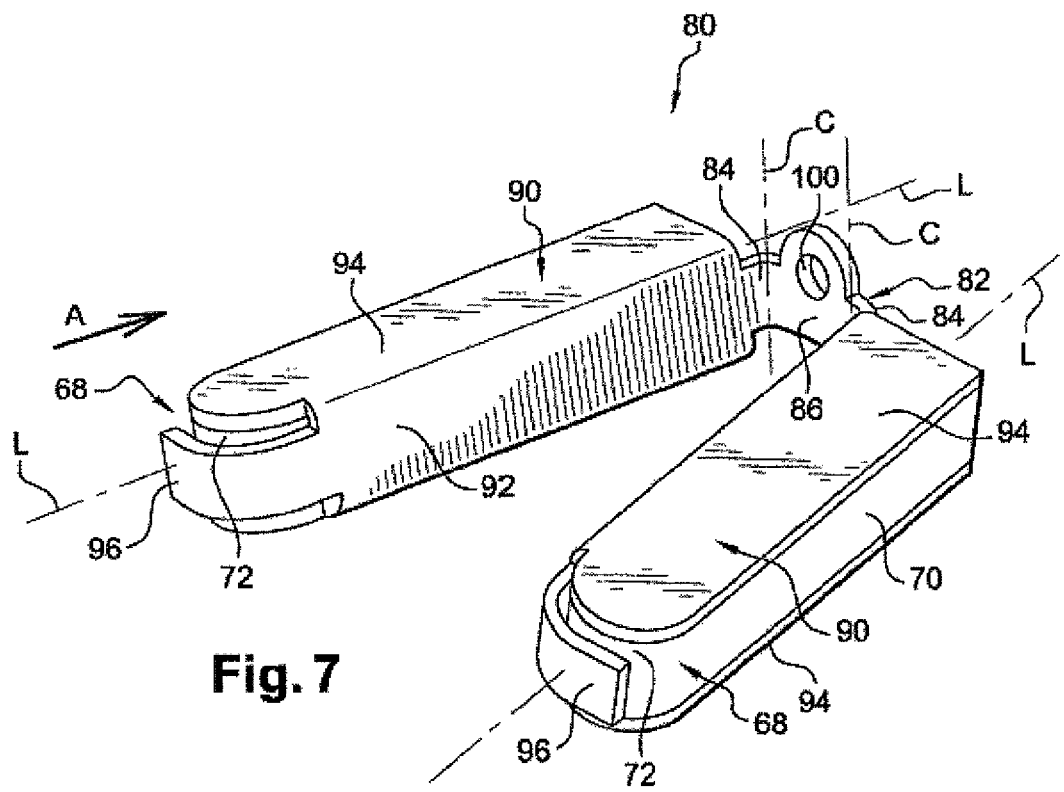
FIG. 7 is an opposed perspective view of the open chain shown in FIG. 6.

As can be seen in greater detail in FIGS. 6 and 7, the front longitudinal end faces 72 of the two magnets 68 are more particularly connected together via a connector 82 which has the shape of a circumferential radial plate which comprises two circumferential ends 84. The open chain 80 is thus "V" shaped with the two arms formed by the two magnets 68 and which is axially open towards the rear.

The connector 82 also comprises an internal face 86 which is intended to be arranged against the free end 56 of the claw under consideration 52D and an opposed external face 88 which is turned towards the scallop 58 associated with the claw under consideration 52D.

The connector 82 is connected at each of its two circumferential ends 84 to said longitudinal front end faces 72 of the magnets 68.

The connector 82 is intended to axially straddle the front free end 56 of the claw under consideration 52D, as illustrated in FIG. 3.

Referring now to FIGS. 6 and 7, each end 84 of the connector 82 is connected to the associated magnet 68 via a support 90 which is intended to carry one of the magnets 68.

Each support 90 forms a sheath in which the associated magnet 68 can be fixed.

Advantageously, the support 90 is shaped so that at least one of the polar radial faces 70 of the magnet 68 is in direct contact with the lateral face 60 facing the interpolar gap 62.

The support 90 shown in FIGS. 6 and 7 have a cross section in the shape of a "U" on its side and open transversely in a direction opposite to the claw under consideration 52D, as can be seen in FIG. 5. The support 90 here comprises a radial core 92 which extends axially rearwardly from an end 84 of the connector 82. Two exterior and interior circumferential wings 94 extend circumferentially from the exterior and interior edges of the core 92 in a direction opposite to the connector 82. Thus, the magnet 68 is received between the two wings 94 such that its south radial polar face 70 is arranged facing the core 92.

The core 92 is thus interposed between the south polar radial face 70 and the associated lateral face 60 of the claw under consideration 52D, while the other north polar radial face 70 is arranged directly facing the other lateral face 60 of the associated interpolar gap 62.

The magnet 68 is, for example, fixed in the support 90 by pinching between the two wings 94.

The support 90 also comprises a tongue 96 which is substantially transverse to the axial end, as can be seen in FIG. 7, which is arranged in the extension of the core 92 at the end opposite to that of the connector 82 and which is curved so as to longitudinally retain the magnet 68 towards the rear.

Advantageously, the connector 82 is articulated so that it can form a pivotal hinge about at least one radial axis so that the adjacent magnets 68 pivot with respect to each other.

Thus, the open chain 80 of magnets 68 is capable of being adapted to different models of polar wheels 46N, 46S which in particular have claw angles "α" which differ from one model to another. Thus, it is not necessary to provide a specific open chain 80 for each model of polar wheel 46N, 46S.

More particularly, the connector 82 has two flexible end sections 84 each one of which is curved about a radial axis "C". Each support 90 is thus pivotable with respect to the connector 82 about an associated radial axis "C" which is arranged substantially at the end 84 associated with the connector 82. The connector 82 thus comprises two parallel pivotal axes "C".

The connector 82 shown in FIGS. 3, 6 and 7 is produced from a metallic material. Thus, the connector 82 is fixedly connected to the magnets 68.

Each support 90 is advantageously produced from an amagnetic metallic material formed as a single piece of material with the connector 82. The supports 90 and connector 82 are, for example, produced by cutting then bending sheet metal. The sheet metal has a thickness of 0.5 mm, for example.

The ends 84 of the connector 82 are designed so as to be elastically or plastically deformable to provide them with the desired flexibility.

Advantageously, as can be seen in FIG. 3, the connector 82 comprises positioning means on the claw under consideration 52D which are intended to cooperate with the associated positioning means of the free end 56 of the claw under consideration 52D by fitting of complementary shapes.

More particularly, the free end 56 of the claw under consideration 52D comprises an axial positioning stud 98 which is intended to be axially fitted into an aperture 100 with a shape which is complementary to the connector 82. Thus, the open chain 80 of magnets 68 is easier to mount.

Further, these positioning means are also capable of forming temporary fixing means for the open chain 80 of magnets 68 on the claw under consideration 52D before the rear polar wheel 46S and the front polar wheel 46N are interleaved with each other.

This arrangement means that the magnets 68 can be mounted on the rotor 24 more rapidly and in a simpler manner.

Further, this arrangement is light and of low bulk as the magnets 68 are held against centrifugal force by the rims 78 formed in the claws 52 themselves. The connector 82 can thus be produced with only a little material without complying with centrifugal force resistance conditions.

The same rotor 24 may, of course, be provided with several independent open chains.

We describe here the method for mounting such a rotor 24 of the rotary electric machine 20. Each magnet 68 is pre-fixed in its associated support 90. At the start of the assembly process, the polar wheels 46N, 46S are not assembled.

Advantageously, the magnets 68 are magnetized at the end of the mounting procedure. Thus, there is no risk that the magnets 68 could break the connector 82 by being mutually attracted or repelled.

Further, it is thus possible to carry out machining operations on the rotor 24 without the magnets 68 attracting iron turnings or filings.

During a first assembly step "E1" for the open chain 80 of magnets 68 on the rotor 24, the open chain 80 of magnets 68 is gripped, for example using a gripping device (not shown) then it is arranged on the rear polar wheel 46S carrying the claw under consideration 52D.

During this first step "E1", the open chain 80 is arranged axially in front of the claw under consideration 52D, the connector 82 facing the free end 56. Next, assembly is carried out using a translational movement towards the rear, causing the positioning stud 98 to penetrate into the aperture 100 of the connector 82.

The positioning means 72, 74 can advantageously temporarily fix the open chain 80 on the claw under consideration 52D.

Next, the front polar wheel 46N is interleaved into the rear polar wheel 46S, as can be seen in FIG. 3. The magnets 68 are then wedged immovably between the two lateral faces 60 of the associated interpolar gap 62.

The central shaft 26 is push fitted into the polar wheels 46N, 46S either during or after the step "E1" for assembling the open chain 80 on the claw under consideration 52D.

Next, during a second step "E2" for magnetization of the magnets 68, the magnets 68 are magnetized. This step for magnetization "E2" of magnets 68 after mounting thereof on the rotor 24 can avoid any errors in orientation of the magnetic poles of each magnet 68.

In a variation of the method for mounting the open chain 80 of magnets 68 on the rotor 24, the second magnetization step "E2" is carried out before the first mounting step "E1". In this case, care should be taken that the facing faces of adjacent magnets 68 form poles of the same type which mutually repel in order to prevent two magnets 68 from becoming stuck to one another, which would risk breaking the connector 82.

Figure 8:
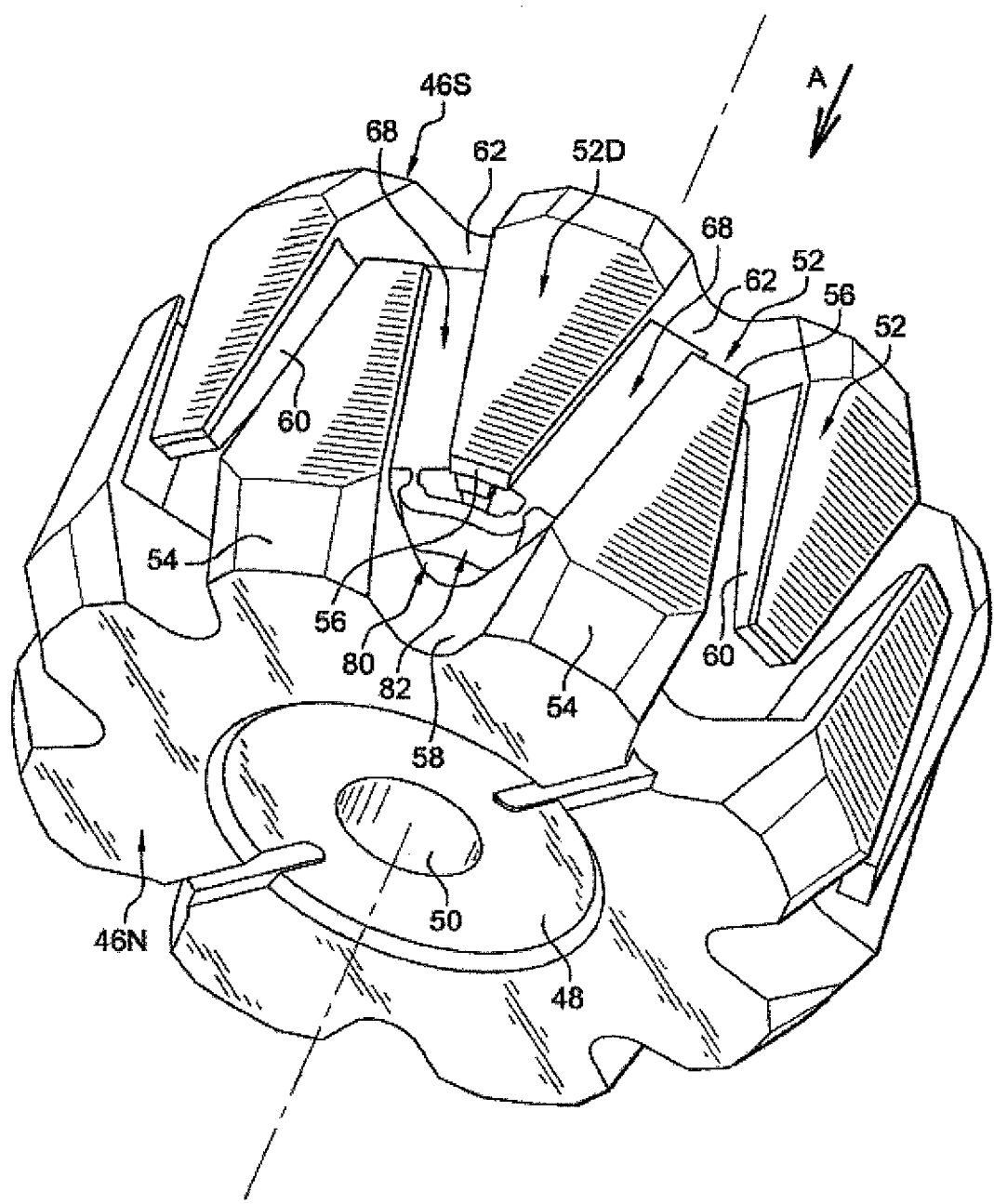
FIG. 8 is a view which is similar to that of FIG. 3 in which the open chain of magnets is produced in accordance with a second embodiment.
Figure 9:
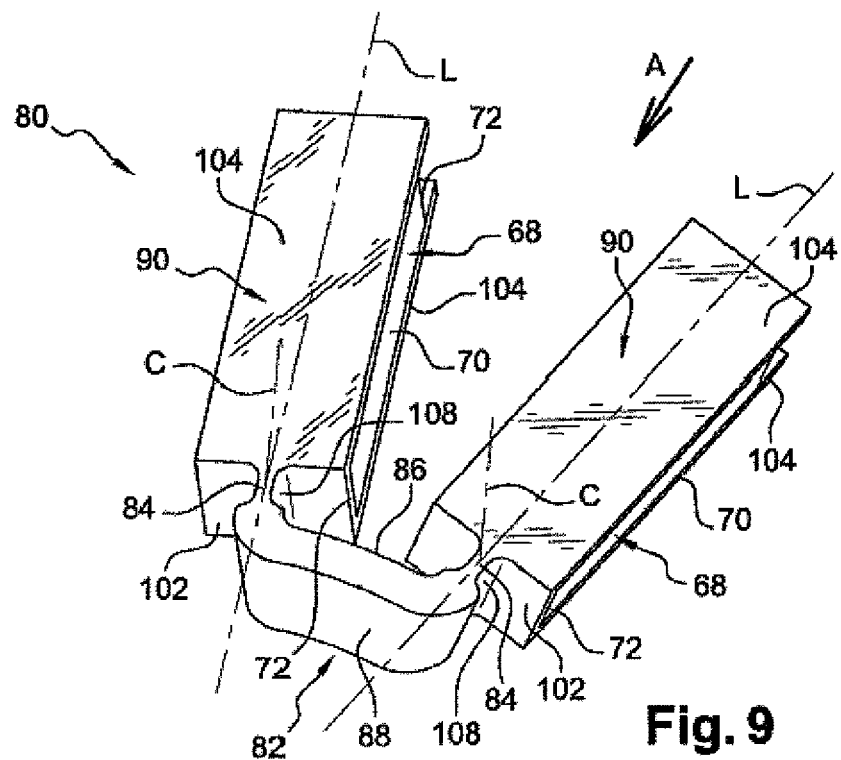
FIG. 9 is a perspective view on a larger scale showing the open chain of two elements of FIG. 8.

FIGS. 8 and 9 show a second implementation of the open chain 80 of magnets 68 in which the connector 82 is produced from a plastic material.

The supports 90 are produced from a plastic material formed in one piece with the connector 82.

More particularly, each support 90 is over-moulded around the associated magnet 68. Each magnet 68 is thus fixed to the support 90.

Producing the supports 90 by over-moulding means that the two radial polar faces 70 of each magnet 68 can be left bare so that each polar radial face 70 directly faces the associated lateral face 60 of the interpolar gap 62.

Each support 90 has a longitudinal cross section in the shape of a "U" on its side, open towards the rear. Each support 90 comprises a transverse core 102 which is arranged against the longitudinal front end face 72 of the magnet 68 and two longitudinal interior and exterior transverse longitudinal wings 104 which extend longitudinally from the interior and exterior edges to cover the interior 74 and exterior 76 faces of the magnet 68.

The circumferential ends 84 of the connector 82 are connected to the centre 106 of the core 102 of each support 90.

The exterior wing 104 is thus interposed between the rim 78 of the lateral faces 60 and the magnet 68 to form a wedge which is capable of taking up radial play.

Each support 90 is articulated elastically and/or plastically about a radial pivotal axis "C" with respect to the connector 82.

Articulation of the connector 82 with respect to the supports 90 is thus produced by two flexible sections formed by films 108 of plastic material which are formed as one piece with the connector 82 and with the supports 90. Each film 108 thus forms the end 84 for connecting the connector 82 with each of the two associated supports 90.

In the example of this second implementation shown in FIGS. 8 and 9, the connector 82 does not comprise means for positioning on the claw under consideration 52D. However, it will be understood that the connector 82 can be equipped with positioning means similar to those described in the first embodiment.

It will be understood that the invention is not limited to open chains 80 with two magnets 68, but it is also applicable to open chains 80 comprising a larger number of magnets 68.

Figure 10:
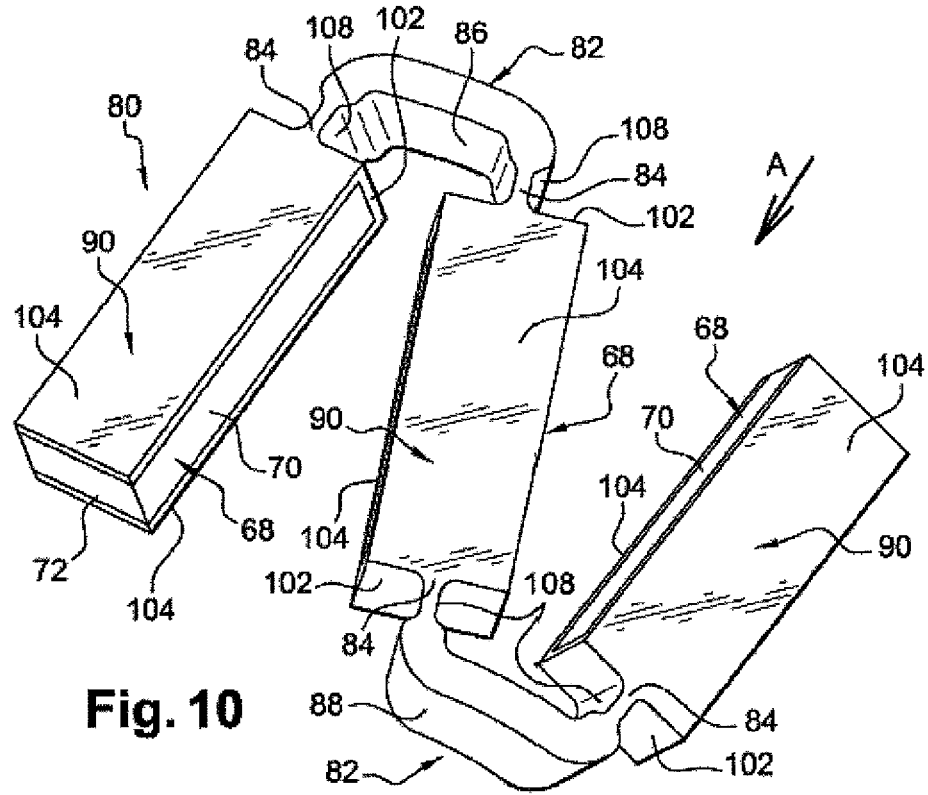
FIG. 10 is a perspective view similar to that of FIG. 9 in which the open chain comprises three magnets.

As can be seen in FIG. 10, then, a variation of the second embodiment of the open chain 80 of magnets 68 comprises a third magnet 68 which is shown on the left in FIG. 10.

The third magnet 68 and the central magnet 68 are intended to be arranged in two associated interpolar gaps 62 which are arranged either side of a claw 52 of the front polar wheel 46N.

The rear longitudinal face 72 of the third magnet 68 is connected to the rear longitudinal end face 72 of the central magnet 68 via a connector 82 in a manner which is similar to that described in the second implementation.

Thus, the third magnet 68 is also carried by a support 90 which is similar to that described in the second implementation. The connector 82 axially straddles the rear free end 56 of said claw 52 of the front polar wheel 46N.

The rear and front longitudinal end faces 72 of the central magnet 68 are thus respectively connected to the first and to the third magnets 68 via two articulated connectors 82 which are similar to that described above.

The central support 90 thus comprises two cores 102 which are arranged on each of the longitudinal end faces 72 of the magnet 68. The longitudinal section of the central support 90 has a closed rectangular contour.

Thus, it is possible to arrange three magnets 68 on the rotor 24 in a single operation.

In accordance with a third implementation, not shown, in the open chain 80 of magnets 68, the connector 82 is produced from a heat-fusible material such as a wax or resin which can temporarily connect the magnets 68.

The connector 82 can thus be connected directly and without supports 90 to the front longitudinal end faces 72 of the magnets 68 by adhesion to the fusible material.

The connector 82 is, for example, intended to melt during initial use of the rotary electric machine 20. To this end, the fusible material is selected so that it melts at a temperature which is less than or equal to the operational temperature of the rotor 24 during normal use of the rotary electric machine 20.

Another known problem with rotary electric machines 20 is that when the rotor 24 rotates at very high speed, heating occurs inside the casing 22.

Figure 11:
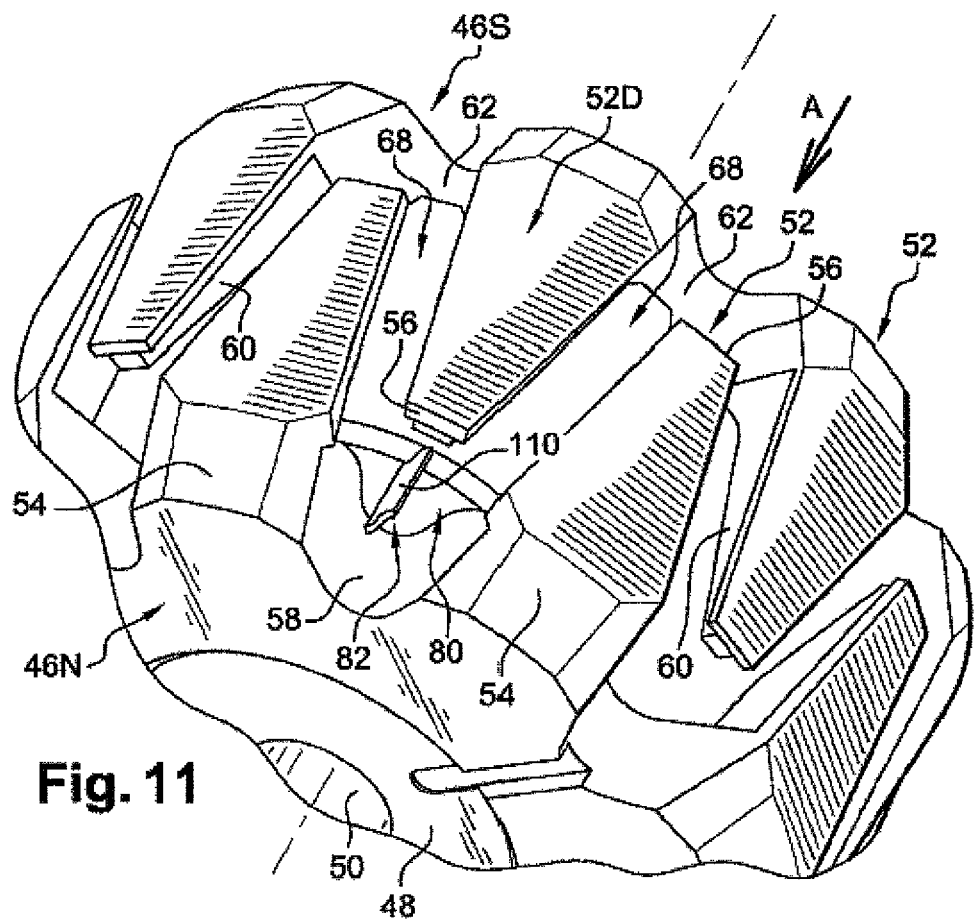
FIG. 11 is a perspective view similar to that of FIG. 8 in which the open chain comprises a ventilation blade.
Figure 12:
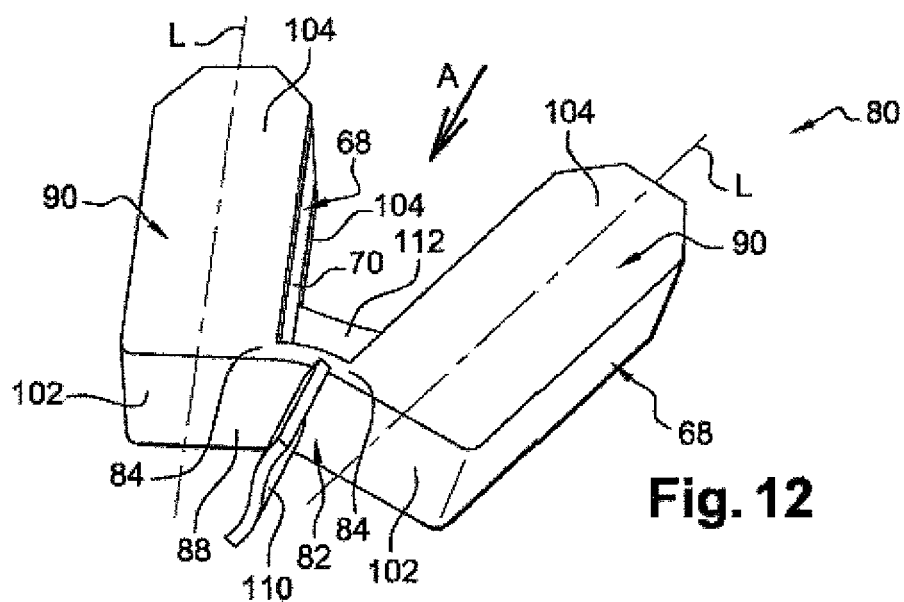
FIG. 12 is a perspective view on a larger scale which shows the open chain of FIG. 11.

In order to overcome this problem, the invention proposes a rotor similar to that described in the first two implementations and in which the connector 82 comprises a ventilation element and more particularly a substantially radial blade 110 which extends axially from the external face 88 of the connector 82 through the associated scallop 58 to form a blade 110 for ventilation during rotation of the rotor 24, as can be seen in FIGS. 11 and 12.

In order to improve the strength of the assembly formed by the supports 90 and the connector 82, the connector 82 is connected to the interior wings 104 of the supports 90 via an axial circumferential rib 112 which is intended to be arranged below the claw under consideration 52D. This rib 112 acts to reinforce the rigidity of the part formed by the connector 82 and the supports 90 in order to prevent the forces exerted by the blade 110 on the connector 82 during rotation of the rotor 24 from causing the connector 82 to break or deform. The forces exerted by the blade 110 are principally circumferential. Thus, it is not necessary for the rib 112 to be arranged in contact with the interior face of the claw under consideration 52D, nor for the rib 112 to be as thick as a rib intended to retain the magnets 68 against centrifugal force.

The blade 110 is shaped so as to agitate the air to allow optimum cooling of the rotary electric machine 20.

In this variation, the supports 90 are not pivotally mounted with respect to the connector 82.

The supports 90, the connector 82, the rib 112 and the blade 110 are produced in a single piece of plastic material, for example by moulding.

It has also been shown that during rotation of the rotor 24 at very high speed, vibrations occur which, inter alia, are caused by the regular passage of the scallops 58 at right angles to certain resonance points of the stator 28. This regular passage of the scallops 58 causes vibrations in the air which resonates, producing disagreeable noises.

In order to break the harmonics of these resonating vibrations and thus to prevent the vibrations from resonating, the invention also proposes replacing the blade 110 by a tip 114. The tip 114 forms a noise reduction element during operation of the rotary electric machine 20. The open scallops 58 are no longer distributed in a regular manner about the rotor 24 and thus they no longer pass at right angles to the resonance points in a regular manner.

Figure 13:
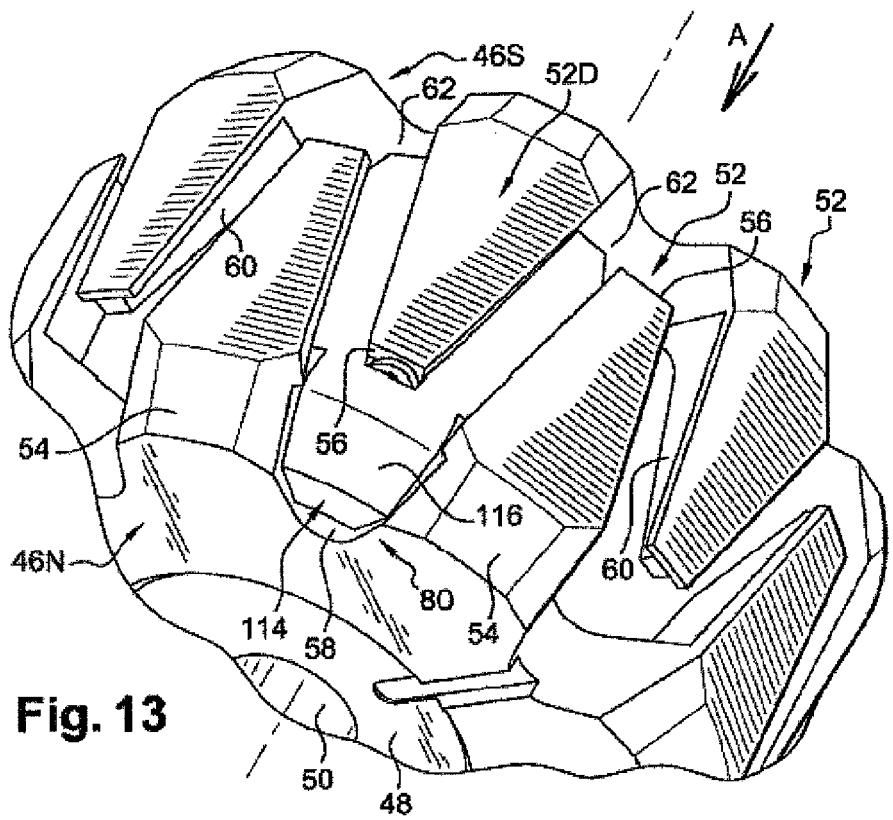
FIG. 13 is a view similar to that of FIG. 11 in which the open chain comprises a tip which is intended to obscure a scallop of one of the polar wheels.
Figure 14:
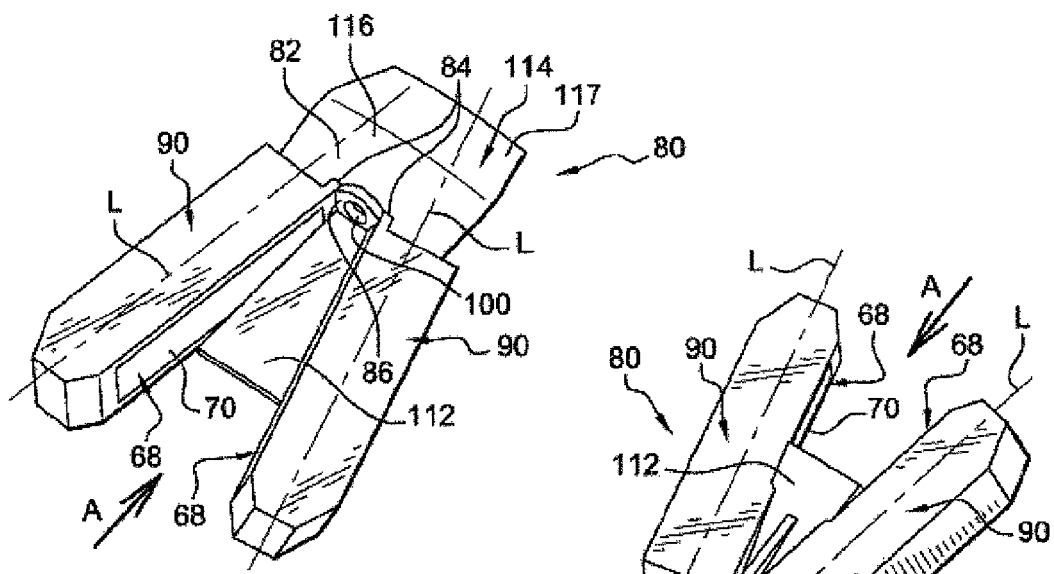
FIG. 14 is a perspective view on a larger scale which shows the open chain of FIG. 13 in more detail.
Figure 15:
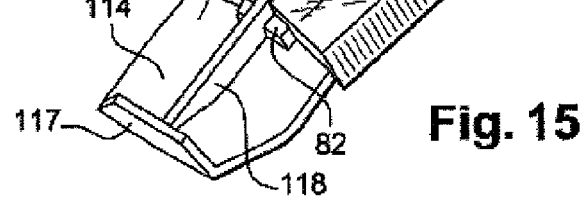
FIG. 15 is an opposed perspective view of the open chain shown in FIG. 14.

As can be seen in FIGS. 13, 14 and 15, the connector 82 carries the tip 114 which is intended to obscure the associated scallop 58 of the front polar wheel 46N. More particularly, the tip 114 is formed by a cover one exterior face 116 of which is shaped as a cylindrical arc in order to be arranged in the continuity of the exterior faces of the claws 52 adjacent to said scallop 58.

A tab extends substantially radially towards the interior from a front end edge of the exterior surface 116 of the tip 114 in order to axially close the front of the scallop 58. Thus, the scallop 58 no longer has any influence on the flow of air about the rotor 24.

In order to prevent the tip 114 itself from vibrating against the front polar wheel 46N, it is advantageous to reinforce its rigidity. To this end, a first substantially axial circumferential rib 112 similar to that described above connects the connector 82 to each of the interior wings 104 of the supports 90. The rib 112 here is arranged in the extension of the exterior face 116 of the tip 114.

In order to stiffen the structure of the tip 114, a second radial rib 118 is arranged so as to connect the interior face of the tip 114 and the interior face of the first rib 112. The second rib 118 thus passes between the two supports 90.

The supports 90, connector 82, ribs 112, 118 and tip 114 are produced in a single piece from plastic material, for example by moulding.

Figure 16:
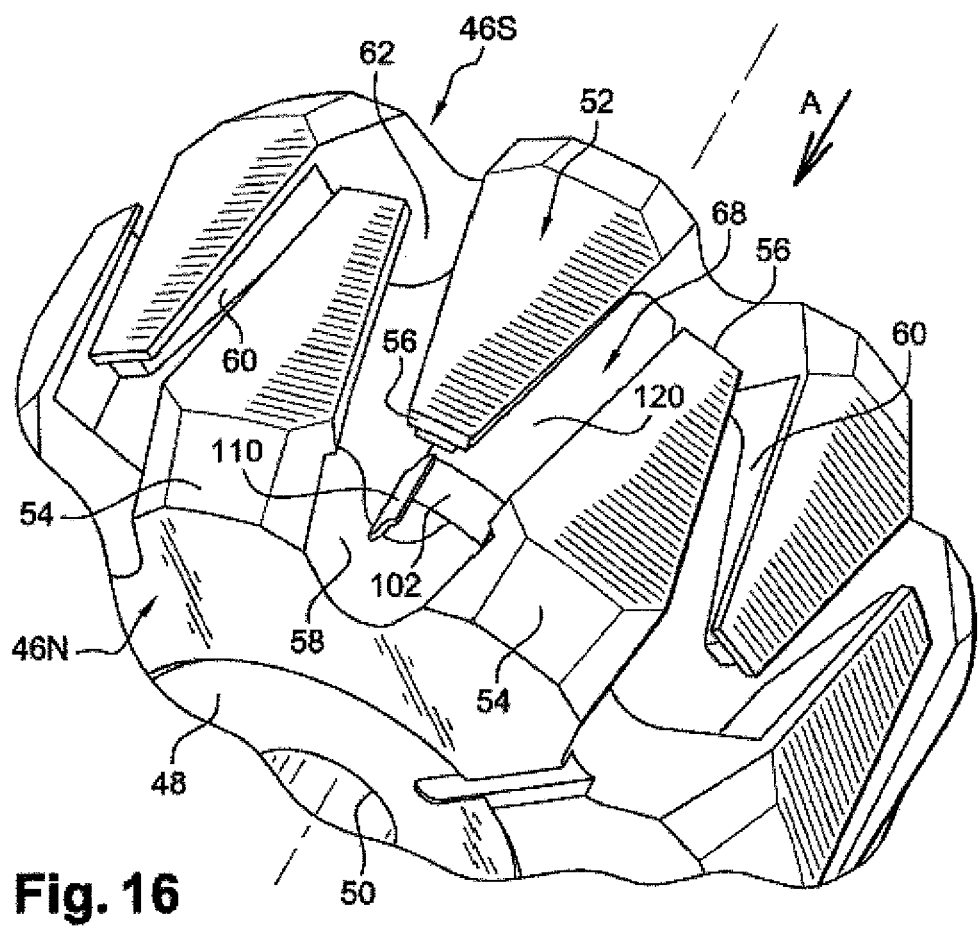
FIG. 16 is a perspective view similar to that of FIG. 3 which represents an arrangement of a single magnet in a rotor, the magnet being carried by an individual support equipped with a ventilation blade.

FIG. 16 shows an arrangement for mounting a single magnet 68 in an interpolar gap 62 of the rotor 12 of the rotary electric machine 10.

More particularly, the magnet 68 is arranged in an associated individual support 120.

The rotor 24 can be equipped with a plurality of single magnets 68 which are each carried by an associated support 120, the individual supports 120 not being connected together.

Each individual support 120 carries an element which is intended to fulfill a particular function as will be described below, for example a ventilation element or a noise reduction element.

Each support 120 forms a sheath in which the associated magnet 68 can be fixed.

Advantageously, the individual support 120 is shaped so that at least one of the radial polar faces 70 of the magnet 68 is in direct contact with the lateral face 60 facing the interpolar gap 62.

The individual support 120 here is produced from a plastic material by moulding.

More particularly, the individual support 120 is over-moulded about the associated magnet 68. Each magnet 68 is thus fixed to the individual support 120.

Producing the individual support 120 by over-moulding means that the two polar radial faces 70 of the magnet 68 can be left bare so that each polar radial face 70 is arranged directly facing each associated lateral face 60 of the interpolar gap 47.

The individual support 120 has a longitudinal section which is in the shape of a "U" on its side open to the rear. The individual support 120 comprises a transverse core 102 which is arranged against a front longitudinal end face 72 of the magnet 68 and two interior and exterior wings 104 which extend longitudinally from the interior and exterior edges to cover the interior 74 and exterior 76 faces of the magnet 68.

The exterior wing 104 is thus interposed between the rim 78 of the lateral faces 60 and the magnet 68 so as to form a wedge which is capable of taking up radial play.

A known problem with rotary electric machines 20 is that when the rotor 24 rotates at very high speed, the interior of the casing 22 heats up.

In order to overcome this problem, the invention proposes arranging a ventilation element, more particularly a substantially radial blade 110 which extends axially from the core 102 of the individual support 120 through the associated scallop 58 to form a blade 110 for ventilation during rotation of the rotor 24, as can be seen in FIG. 16.

The blade 110 is shaped to agitate the air to allow optimum cooling of the rotary electric machine 20.

The individual support 120 and the blade 110 are produced in a single piece from plastic material, for example by moulding.

The blade 110 connects to one side of the support 10 or, in a variation which is not shown, over the centre thereof into the axis of the magnet 68.

In a variation which is not shown, the individual support 120 comprises two cores 102 which are arranged on each of the longitudinal ends 72 of the magnet 68. The longitudinal section of the individual support 120 thus has a closed rectangular contour.

A second blade is arranged on the opposite core. Thus, the rotor 24 comprises two fans which act to stir the air either side of the rotor 24.

Further, it has also been shown that during rotation of the rotor 24 at very high speed, vibrations are produced which are, inter alia, caused by the regular passage of the scallops 58 at right angles to certain resonance points of the stator 28. This regular passage of the scallops 58 causes vibrations in the air which causes resonance, producing disagreeable noises.

In order to break the harmonics of these resonating vibrations and thus to prevent the vibrations from resonating, the invention also proposes replacing the blade 110 by a tip 114. The tip 114 forms an element for reducing noise during the operation of the rotary electric machine 20. The open scallops 58 are no longer distributed in a regular manner around the rotor 24 and thus they no longer pass over the resonance points in a regular manner.

Thus, in a variation of the invention as shown in FIGS. 17, 18 and 19, the core 102 carries the tip 114 which is intended to obscure the associated scallop 41. More particularly, the tip 114 comprises a shell the exterior face 116 of which is shaped into a cylindrical arc in order to be arranged in the continuity of the exterior faces of the claws adjacent to said scallop 58.

In order to prevent the tip 114 itself from vibrating against the polar wheel, it is advantageous to reinforce its rigidity. To this end, a radial rib 118 is arranged in order to connect the interior face of the tip 114 and the core of the individual support 120.

The individual support 120, the rib 118 and the tip 114 are produced in a single piece from plastic material, for example by moulding.

In a variation which is not shown, the individual support 120 comprises two cores which are arranged at each of the longitudinal ends 72 of the magnet 68. The longitudinal section of the individual support 120 thus has a closed rectangular contour.

A second noise reduction tip is arranged on the opposite core. Thus, the rotor comprises two fans which act to agitate the air either side of the rotor.

In accordance with yet another variation, the individual support 120 comprises two cores with a longitudinal end, one of which carries a blade and the other of which carries a noise reduction tip.

This arrangement for mounting a single magnet means that the rotor 24 can be simultaneously equipped with a magnet 68 and another function such as a ventilation function or noise reduction tip function, in a single mounting operation.

The invention claimed is:

1. A rotor (24) for a rotary electric machine (20), adapted to be used for an automotive vehicle, the rotor rotatably mounted about an axially orientated axis of rotation (B), the rotor comprising:
   a front polar wheel (46N) and a rear polar wheel (46S) both mounted centrally about the axis of rotation (B);
   each of the front and rear polar wheels (46N, 46S) having a base (54) arranged at the periphery thereof and claws (52) extending axially in the direction of the other polar wheel (46N, 46S) from the base (54) to a free end (56) of the claw (52), each of the claws (52) of one polar wheel (46N, 46S) being circumferentially interleaved between two axially adjacent peripheral claws (52) of the other polar wheel (46N, 46S), each of the claws (52) being delimited circumferentially by two lateral faces (60);
   at least two interpolar gaps (62) provided between the facing lateral faces (60) of the two consecutive claws (52) of each of the polar wheels (46N, 46S);
   at least two elements (68) forming a magnetic barrier and arranged in the at least two interpolar gaps (62) either side of the claw (52D) of the rear polar wheel (46S);
   longitudinal front ends (72) of the elements (68) being connected together so as to form an open chain (80), via a connector (82);
   the connector (82) having two ends (84) connecting the longitudinal front ends (72) of the elements (68) so as to axially straddle the free end (56) of the claw (52D) of the rear polar wheel (46S).

2. The rotor (24) according to claim 1, wherein each end (84) of the connector (82) is connected to one of the elements (68) via a support (90) carrying one of the elements (68).

3. The rotor (24) according to claim 1, wherein the connector (82) is articulated so as to form a hinge pivoting about at least one radial axis (C) in order that the elements (68) forming the magnetic barrier are pivotable with respect to each other.

4. The rotor (24) according to claim 1, wherein the connector (82) is produced from a heat-fusible material in order to temporarily connect the elements (68).

5. The rotor (24) according to claim 1, wherein the connector (82) is positively connected to the elements (68) forming the magnetic barrier.

6. The rotor (24) according to claim 5, wherein the connector (82) is produced from a plastic material.

7. The rotor (24) according to claim 2, wherein the supports (90) are produced in one piece with the connector (82) from a plastic material.

8. The rotor (24) according to claim 7, wherein each support (90) is over-moulded about the element (68) forming the magnetic barrier.

9. The rotor (24) according to claim 6, wherein the articulation of the connector (82) is produced by means of at least one film (108) of plastic material which is formed in one piece with the connector (82).

10. The rotor (24) according to claim 5, wherein the connector (82) is produced from an amagnetic metallic material.

11. The rotor (24) according to claim 10, wherein each support (90) is produced from an amagnetic metallic material formed in one piece with the connector (82).

12. The rotor (24) according to claim 1, wherein the connector (82) comprises positioning means (100) provided to cooperate and fit with complementary positioning means (98) of the free end (56) of the claw (52D) of the rear polar wheel (46S) by means of complementary shapes.

13. The rotor (24) according to claim 1, wherein the connector (82) comprises a blade (110) which extends axially in a direction opposite to the claw (52D) of the rear polar wheel (46S) in order to form a blade for ventilation during rotation of the rotor (24).

14. The rotor (24) according to claim 1, wherein the connector (82) comprises a tip (114) provided to obscure a scallop (58) comprised between the base (54) of the two claws (52) adjacent to the claw (52D) of the rear polar wheel (46S) in order to prevent certain vibrations from resonating during rotation of the rotor (24).

15. The rotor (24) according to claim 1, wherein the open chain (80) of the elements (68) includes at least three elements (68) forming the magnetic barrier.

16. The rotor (24) according to claim 1, wherein an exterior edge of at least one lateral face (60) of each interpolar gap (62) comprises a rim (78) which extends circumferentially towards the interior of the interpolar gap (62) in order to radially retain the element (68) and to counteract the centrifugal force when the rotor (24) is rotating.

17. The rotor (24) according to claim 1, wherein each the elements (68) is a permanent magnet, formed from ferromagnetic material.

18. The rotor according to claim 17, wherein at least one of the magnets in the interpolar gap is formed by a single piece.

19. The rotor according to claim 17, wherein at least one of the magnets in the interpolar gap is formed by several pieces.

20. A method for mounting a rotor (24) of a rotary electric machine (20), adapted to be used for an automotive vehicle, the rotor rotatably mounted about an axially orientated axis of rotation (B), the rotor comprising:
- a front polar wheel (46N) and a rear polar wheel (46S) both mounted centrally about the axis of rotation (B);
- each of the front and rear polar wheels (46N, 46S) having a base (54) arranged at the periphery thereof and claws (52) extending axially in the direction of the other polar wheel (46N, 46S) from the base (54) to a free end (56) of the claw (52), each of the claws (52) of one polar wheel (46N, 46S) being circumferentially interleaved between two axially adjacent peripheral claws (52) of the other polar wheel (46N, 46S), each of the claws (52) being delimited circumferentially by two lateral faces (60);
- at least two interpolar gaps (62) provided between the facing lateral faces (60) of the two consecutive claws (52) of each of the polar wheels (46N, 46S);
- at least two magnets (68) forming a magnetic barrier and arranged in two associated interpolar gaps (62) either side of the claw (52D) of the rear polar wheel (46S);
- longitudinal front ends (72) of the magnets (68) being connected together so as to form an open chain (80), via a connector (82);
- the connector (82) having two ends (84) connecting the longitudinal front ends (72) of the magnets (68) so as to axially straddle the free end (56) of the claw (52D) of the rear polar wheel (46S);
- each the magnets (68) being a permanent magnet formed from ferromagnetic material;
- the method comprising the steps of:
- assembling the open chain (80) of the magnets (68) on the rotor (24); and
- magnetizing the magnets (68).

21. The method according to claim 20, wherein the magnetization step is carried out after the assembly step.

22. The method according to claim 20, wherein the magnetization step is carried out before the mounting step so that polar radial faces (70) of the magnets (68) of the open chain (80) facing the lateral face 60 of the claws (52) form poles of the same type which mutually repel.

23. The rotor (24) according to claim 1, wherein a number of the open chain (80) of the elements (68) is less than a number of the claws of each of the front and rear polar wheels (46N, 46S).

\* \* \* \* \*